Figure 1:
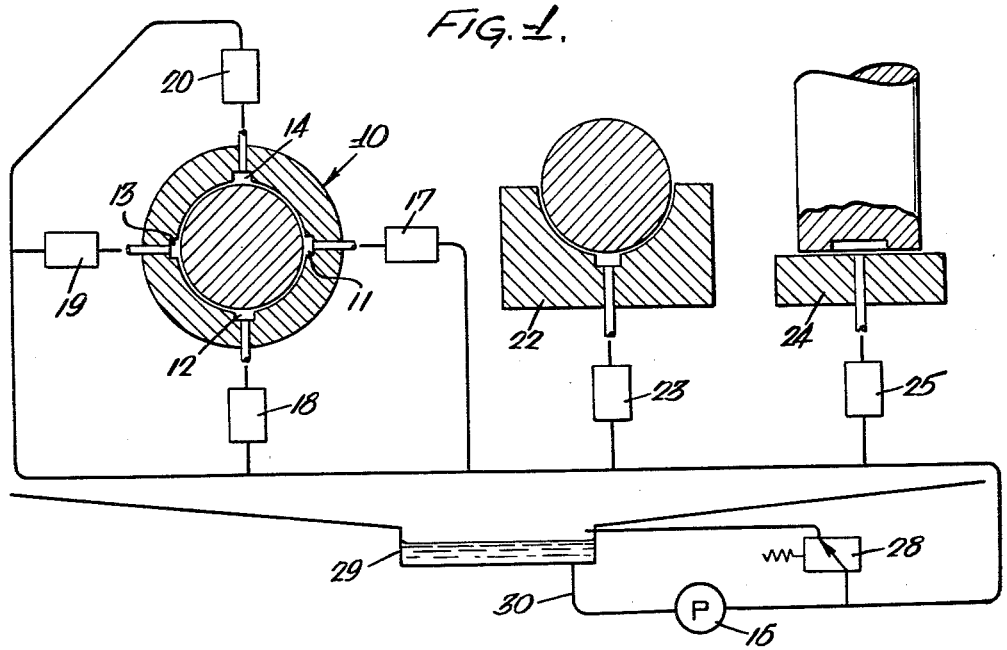

May 31, 1960 A. M. LOEB 2,938,756

BEARINGS

Filed Sept. 29, 1958

Inventor:
Alfred M. Loeb
by Howson & Howson
Attys.

United States Patent Office 2,938,756
Patented May 31, 1960

2,938,756
BEARINGS

Alfred M. Loeb, Trevose, Pa., assignor to The Franklin Institute, Philadelphia, Pa., a corporation of Pennsylvania Filed Sept. 29, 1958, Ser. No. 764,088

5 Claims. (Cl. 308—122)

The present invention relates to bearings, and more particularly to improved controls for hydrostatic bearings in which a pressurized lubricant or other fluid supplied from an external source is caused to flow through the bearing to provide a fluid film separating the moving parts of the bearing.

In bearings of this type, when the lubricant or other fluid is assumed to have constant viscosity, the flow of the lubricant through the bearing is proportional to the load on the bearing and to the cube of the film thickness. In addition, the pressure of the lubricant in the bearing recess is proportional to the load on the bearing.

When a single hydrostatic bearing is supplied from a constant displacement pump, all of the flow from the pump is delivered to the recess for the fluid in the bearing. The pump pressure will automatically rise to the pressure required to lift the bearing member initially to provide clearance for the flowing film of fluid. However, should two or more bearings be supplied from the same pump, because of differences among the bearings, i.e., such as load, geometry, etc., one is likely to lift before the others. If this occurs, the manifold pressure decreases and will be determined by the load on the lifted bearing in accordance with the pressure in the bearing created by the load. The entire output of the pump will then be discharged through the lifted bearing, and the other bearings will never lift.

To limit the flow to the first lifted bearing, various methods of compensation have been employed to allow the pump pressure to rise to the value necessary to lift the other bearings in the circuit.

The earliest and perhaps one of the simplest methods was to put an orifice or capillary (hydraulic resistance) in series with each of the bearings. Thus, when the first bearing lifts and flow through that bearing begins, the pressure in the manifold drops. As the flow to the bearing increases, the pressure drop across the capillary increases. It follows that the manifold pressure increases since the pressure in the recess remains fixed at the value necessary to support the load on the bearing.

The problem of initial lift is further complicated when the loads and geometry of the bearings are different. It is even further compounded when the load can be zero or negligible on one of the bearings. The greater the difference in load and the greater the number of bearings connected to a given pump, the greater must be the fluid resistance in series with each bearing. When all bearings are lifted, this greater resistance consumes considerable power.

With the foregoing in mind, the present invention overcomes the deficiencies of the prior art by providing a flow control valve for each of the bearings in the circuit. The flow control valves insure sufficient flow to each of the bearings in the circuit to effect the initial lift thereof and prevent all of the lubricant from discharging through the first bearing lifted. The flow control valves reduce the hydraulic resistance in the system over that of the prior art controls.

Another important object of the present invention is to provide a hydrostatic bearing of improved stiffness wherein an increase in load on the bearing does not reduce the flow through the bearing and a decrease in load on the bearing does not increase the flow therethrough.

One embodiment of the invention also provides a bearing for which the characteristics are more easily calculated by maintaining the flow through the bearing constant and thereby eliminating a variable component from the calculations.

In accordance with another embodiment of the invention, an improved flow control valve operates to correct the flow upon change of pressure in the recess resulting from a change in load to thereby maintain the film thickness substantially constant regardless of load variations.

The invention also enables accurate control of the film thickness to permit hydraulic "shimming."

Figure 2:
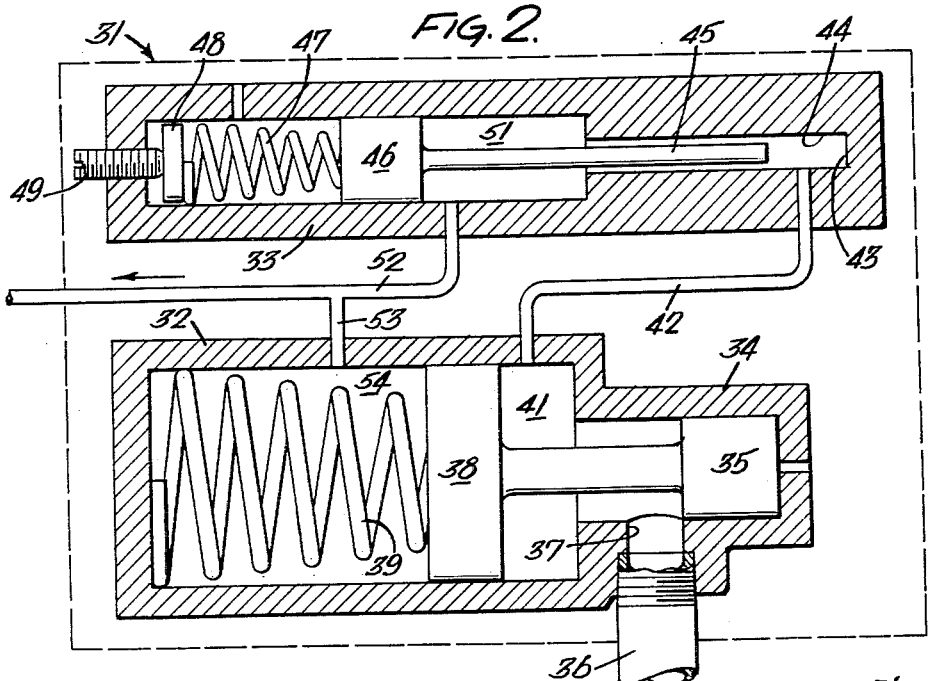

All of the objects of the invention and the arrangement and operation thereof are more fully set forth hereinafter with reference to the accompanying drawings in which:

Fig. 1 is a diagrammatic representation of an embodiment of the invention showing a circuit for lubricant in an apparatus employing a plurality of hydrostatic bearings; and Fig. 2 illustrates a flow control valve which may be used in the circuit of Fig. 1 to maintain the film thickness in the hydrostatic bearings substantially constant.

Referring now to the drawing, Fig. 1 illustrates a hydraulic circuit for an apparatus embodying a plurality of hydrostatic bearings. In the apparatus, there is a journal bearing 10 having a plurality, in the present instance four, of recesses 11, 12, 13 and 14 for the lubricant. The lubricant is supplied from a pump 16 and the flow to each recess is controlled by a flow control valve shown diagrammatically at 17, 18, 19 and 20, respectively. In the present instance, the flow control valves are of the type that keep the flow of lubricant constant regardless of inlet or outlet pressures. Such valves are available from several manufacturers and need not be described in detail herein. The apparatus also includes a cradle bearing 22 supplied from the pump 16 through a flow control valve 23 which may be similar to the valves 17, 18, 19 and 20; and a step bearing 24 which is likewise supplied from the pump 16 through a flow control valve 25 which may be similar to the previously described valves. If necessary, a pressure relief valve 28 may be incorporated in the system and the lubricant may be recirculated by returning the fluid to the pump 16 through a reservoir 29 and return line 30.

In the operation of the circuit, the pump 16 supplies sufficient lubricating liquid to supply the requirements of the various flow control valves in the circuit, thereby maintaining the flow through each valve constant at the desired rate to maintain the desired film thickness under the specified loads. The pump pressure need be only 100 p.s.i. higher than the maximum pressure required in any of the recesses for satisfactory operation of the bearings. This results in a considerable saving of power over orifice or capillary-compensation where the pressure drop needed for proper compensation is often as high as 1000 p.s.i.

In accordance with the invention, the stiffness of a hydrostatic bearing is increased by using a flow control valve to compensate the system. In an orifice-compensated bearing when the load increases, a decrease in flow occurs thereby compounding the decrease in film thickness. A lesser flow is required to effect the necessary decrease in pressure drop across the compensating orifice and an increase in recess pressure. The same is true of capillary compensation. In other words, to get a pressure rise in the recess of a capillary or orifice-compensated bearing, there must be associated with this pressure rise a decrease in flow. However, if, in accordance with this invention, constant-flow control valves are used, the flow to each bearing or bearing recess is held constant by the valve and is independent of recess pressure. For a given decrease in film thickness, if the flow is held constant rather than being allowed to decrease, a greater load increase can be supported. Thus, the flow-control-valve-compensated bearing is stiffer than a similar orifice or capillary-compensated bearing.

An additional and highly desirable advantage is that the characteristics of valve-compensated bearings (flow, load carrying capacity and film thickness) are more easily calculated. The ability to remove the flow term as a common, constant factor from the complicated equations which express the properties of these bearings simplifies the analytical work considerably.

In place of the constant-flow control valve discussed above, a pressure-responsive flow control valve may be employed. In a valve of this type, the flow through the valve is dependent upon the outlet pressure of the valve so that when the outlet pressure increases, the flow increases and when the outlet pressure decreases, the flow decreases. Preferably, the flow varies linearly with the outlet pressure so that the ratio of flow to pressure is held constant. When a valve of this nature is employed in the circuit of Fig. 1, the film thickness remains constant since the flow is proportional to the pressure in the recess and the cube of the film thickness. In this way, the bearing has infinite stiffness since the film thickness is constant regardless of the load on the bearing.

Fig. 2 illustrates a pressure-responsive flow-control valve in which the flow is directly proportional to the outlet pressure of the valve. The valve 31 comprises a balancing cylinder 32 and a control cylinder 33. The balancing cylinder 32 has an extension 34 of reduced bore which mounts a throttling spool 35 for slidable movement therein. Lubricant from the supply line 36 is introduced into the extension 34 through a port 37 which is operable to be closed by the throttling spool 35. The throttling spool is actuated by a balancing piston 38 slidably mounted in the bore of the balancing cylinder 32 and biased to the right hand limit position, for example by a spring 39. The spring 39 is designed so that for the short motion required to open and close the inlet port 37, the spring force is substantially constant. In the illustrated limit position, the throttling spool affords full flow of lubricant through the port 37 and into the forward chamber 41.

From the forward chamber 41 of the balancing cylinder 32, the lubricant passes through a conduit 42 and a variable capillary 43 formed in the forward end of the control cylinder 33. The variable capillary 43 comprises a substantially cylindrical bore 44 having an axially movable plug 45 therein. The hydraulic resistance of the variable capillary 43 varies linearly with the displacement of the plug 45. In accordance with the invention, the position of the plug 45 is determined by a control piston 46 slidably mounted in the bore of the control cylinder 33. The control piston 46 is biased toward the right as seen in Fig. 2 by a spring 47 bearing at one end against the piston 46 and at the other end against an adjustable stop 48 which is operated by a set screw 49. The lubricant flowing through the variable capillary 43 enters the forward chamber 51 of the control cylinder 33 and from there passes through a conduit 52 to the bearing recess. A branch line 53 is provided to introduce the lubricant into the rear chamber 54 of the balancing cylinder.

In the operation of the improved valve, the pressure in the bearing recess is transmitted to the forward chamber 51 of the control cylinder 33 and the rear chamber 54 of the balancing cylinder 32. The balancing piston 38, therefore, is responsive to the pressure differential across the variable capillary 43 so that when the pressure differential tends to decrease, due to decrease in the hydraulic resistance and for a decrease in flow, the balancing piston 38 is displaced toward the right. In like manner, when the pressure differential tends to increase due to an increase in the hydraulic resistance and for an increase in flow, the balancing piston 38 moves toward the left to close the port 37. Since the spring force of the spring 39 is constant, the balancing piston moves the throttling spool 35 to such a position that the pressure drop across the variable capillary 43 is held constant. Since the hydraulic resistance of the variable capillary is dependent linearly upon the position of the plug 45, the flow through the capillary must increase when the plug is displaced to the left, and must decrease when the plug is moved to the right. The position of the plug 45 is dependent upon the pressure in the recess since this pressure operates against the control piston 46. Thus, when the pressure increases (due to an increase in load) the piston 46 is displaced toward the left, decreasing the hydraulic resistance of the variable capillary 43. Since the balancing piston 38 operates to maintain the pressure drop across the variable capillary constant, the balancing piston 38 moves to the right to increase the flow through the capillary to compensate for the decrease in resistance. The increased flow through the capillary is directed to the bearing recess and the valve 31 therefore maintains the ratio of pressure to flow constant in the recess and thereby maintains the film thickness constant. Since all other variables are all constant, the film thickness is dependent only upon the cube root of "flow" over "pressure." When the pressure in the recess falls (due to a reduction in load), the pressure in the chamber 51 drops displacing the control piston 46 to the right and operating the variable capillary 43 to increase its hydraulic resistance. The balancing piston 38 will therefore be displaced toward the left to maintain the pressure drop across the variable capillary 43 constant by decreasing the flow through the variable capillary. This is accomplished by causing the throttling spool 35 to close the port 37. The set point of the valve 31 is controlled by regulating the stop 48 through the medium of the screw 49.

It is seen therefore that by using the valve 31 in place of one or more of the constant flow valves of the previously described embodiment, the hydrostatic bearing associated with the valve 31 may be set with infinite stiffness whereby there is substantially no "play" in the bearing under varying conditions of load.

Although Fig. 1 illustrates only the more common applications of hydrostatic bearings, it is to be understood that the invention may be applied to any hydrostatic bearing in which liquid lubricant or any other suitable fluid is continuously supplied to a recess or clearance space between two bearing members to provide a fluid film which separates the bearing members.

The valve 31 has been described and illustrated with a variable capillary as the hydraulic resistance device. Of course, other devices, for example, a variable orifice, may be substituted where the range of movement is limited.

While particular embodiments of the present invention have been herein illustrated and described, it is not intended to limit the invention to such disclosure, but changes and modifications may be made therein and thereto within the scope of the following claims:

I claim:

1. A flow control valve having an inlet conduit and an outlet conduit, a control cylinder having a control piston slidable therein, means connecting said outlet conduit to said cylinder at one side of said control piston and bias means at the other side of said control piston whereby said piston is responsive to the pressure of said outlet conduit, a variable capillary in said control cylinder comprising a cylindrical bore communicating at one end with said cylinder at said one side of said piston, and a plug slidable longitudinally in said bore mounted on said control piston for movement therewith, a balancing cylinder, a balancing piston slidably mounted therein, conduit means connecting opposite ends of said balancing cylinder to the opposite ends of said variable capillary to be responsive to the pressure drop across said capillary, a constant pressure bias means connected to said balancing piston to counteract said pressure drop, a port connected to said valve inlet conduit for introducing fluid to the other end of said variable capillary, and a throttling spool connected to said balancing piston to selectively close and open said port in response to displacement of said balancing piston, said throttling means being operated when the pressure drop across said capillary varies from a predetermined value determined by said constant pressure bias means for said balancing piston so that the flow is varied inversely with the hydraulic resistance of said capillary and directly with the pressure in the outlet conduit of said valve.

2. In a hydrostatic bearing having a bearing recess and a supply conduit for the fluid, the improvement consisting of a flow control valve positioned intermediate said conduit and said recess and including means to throttle the flow of fluid through said valve, means to sense the pressure in said bearing recess, a variable resistance intermediate said throttling means and said bearing recess having a hydraulic resistance proportional to its displacement, said pressure-sensing means being operable to alter the displacement of said resistance, and a piston displaceable in response to variations in the pressure drop across said resistance and connected to said throttling means to open the throttling means upon increase in pressure in said recess and close said throttling means upon reduction of pressure in said recess to thereby maintain said pressure drop substantially constant.

3. Apparatus according to claim 2 wherein said pressure-sensing device comprises a control cylinder, a piston mounted in said cylinder, means to bias said piston towards one end of said cylinder, and a conduit for introducing the bearing recess pressure into said one end of the cylinder whereby said piston is responsive to the pressure in said recess.

4. A valve according to claim 3 wherein said variable resistance comprises a capillary with a cylindrical bore having a longitudinally displaceable plug therein, and wherein further said variable capillary is mounted at said one end of said control cylinder and is connected to said piston.

5. A valve according to claim 3 wherein said bias means comprises a spring mounted in the other end of said control cylinder bearing at one end against said piston, adjustable stop means mounting the other end of said spring, and an operator to displace said adjustable stop means to thereby control the response of said piston to the pressure in said bearing recess.

References Cited in the file of this patent

UNITED STATES PATENTS

| | | |
|---|---|---|
| 2,000,913 | Bijur | May 14, 1935 |
| 2,327,025 | Davis | Aug. 17, 1943 |
| 2,354,634 | Griswold | July 25, 1944 |
| 2,459,826 | Martellotti | Jan. 25, 1949 |
| 2,623,331 | Greening | Dec. 30, 1952 |
| 2,788,862 | Langer | Apr. 16, 1957 |
| 2,833,374 | Glasser | May 6, 1958 |